(12) United States Patent
Choi et al.

(10) Patent No.: US 11,108,104 B2
(45) Date of Patent: Aug. 31, 2021

(54) METAL-AIR BATTERY HAVING CYLINDRICAL STRUCTURE

(71) Applicant: SAMSUNG ELECTRONICS CO., LTD., Suwon-si (KR)

(72) Inventors: Wonsung Choi, Yongin-si (KR); Kyounghwan Choi, Suwon-si (KR); Hyukjae Kwon, Suwon-si (KR); Taeyoung Kim, Seoul (KR); Heungchan Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/679,844

(22) Filed: Nov. 11, 2019

(65) Prior Publication Data

US 2020/0076030 A1 Mar. 5, 2020

Related U.S. Application Data

(63) Continuation of application No. 15/489,800, filed on Apr. 18, 2017, now Pat. No. 10,505,242.

(30) Foreign Application Priority Data

Sep. 30, 2016 (KR) .................. 10-2016-0127142

(51) Int. Cl.
| | | |
|---|---|---|
| *H01M 4/00* | (2006.01) | |
| *H01M 12/08* | (2006.01) | |
| *H01M 50/107* | (2021.01) | |
| *H01M 50/409* | (2021.01) | |
| *H01M 50/138* | (2021.01) | |
| *H01M 4/13* | (2010.01) | |

(52) U.S. Cl.
CPC ............ *H01M 12/08* (2013.01); *H01M 4/13* (2013.01); *H01M 50/107* (2021.01); *H01M 50/1385* (2021.01); *H01M 50/409* (2021.01); *Y02E 60/10* (2013.01)

(58) Field of Classification Search
CPC .......... Y02E 60/50; Y02E 60/10; H01M 4/13; H01M 12/08; H01M 2/022
See application file for complete search history.

(56) References Cited

U.S. PATENT DOCUMENTS

| 6,805,995 B2 | 10/2004 | Yoshinaka et al. |
| 7,824,806 B2 | 11/2010 | Visco et al. |
| (Continued) | | |

FOREIGN PATENT DOCUMENTS

KR   1020150135918 A   12/2015

*Primary Examiner* — Cynthia H Kelly
*Assistant Examiner* — Monique M Wills
(74) *Attorney, Agent, or Firm* — Cantor Colburn LLP

(57) ABSTRACT

A metal-air battery includes a unit cell wound into a roll. The unit cell includes a negative-electrode metal layer having a first surface located in a circumferential direction of the roll and a second surface facing the first surface and located in the circumferential direction of the roll; a first electrolyte film and a first positive-electrode layer sequentially disposed on the first surface of the negative-electrode metal layer; and a second electrolyte film and a second positive-electrode layer sequentially disposed on the second surface of the negative-electrode metal layer. The unit cell is wound in a way such that the first positive-electrode layer and the second positive-electrode layer face each other.

19 Claims, 10 Drawing Sheets

(56) References Cited

U.S. PATENT DOCUMENTS

| | | |
|---|---|---|
| 8,871,394 B1 | 10/2014 | Garcia et al. |
| 8,895,197 B2 | 11/2014 | Friesen et al. |
| 2001/0041276 A1 | 11/2001 | Yang et al. |
| 2004/0038090 A1* | 2/2004 | Faris .................. H01M 8/2465 29/623.1 |
| 2007/0077485 A1* | 4/2007 | Takamura ............. H01M 12/06 429/82 |
| 2012/0231323 A1* | 9/2012 | Takagi ................. H01M 2/145 429/144 |
| 2014/0106240 A1* | 4/2014 | Kotani ................... H01M 4/50 429/405 |
| 2015/0340747 A1 | 11/2015 | Kwon et al. |
| 2018/0076495 A9 | 3/2018 | Park et al. |

\* cited by examiner

METAL-AIR BATTERY HAVING CYLINDRICAL STRUCTURE

CROSS-REFERENCE TO RELATED APPLICATION

This application is a continuation of U.S. application Ser. No. 15/489,800, filed on Apr. 18, 2017, which claims priority to Korean Patent Application No. 10-2016-0127142, filed on Sep. 30, 2016, and all the benefits accruing therefrom under 35 U.S.C. § 119, the content of which in its entirety is herein incorporated by reference.

BACKGROUND

1. Field

Embodiments set forth herein relate to a metal-air battery, and more particularly, to a cylindrical metal-air battery having improved energy density.

2. Description of the Related Art

A metal-air battery typically includes a negative electrode capable of intercalating/deintercalating ions and a positive electrode that uses oxygen from an outside, e.g., in the air, as an active material. In the metal-air battery, reduction and oxidation reactions of oxygen received from the outside occur in the positive electrode, oxidation and reduction reactions of the metal occur in the negative electrode, and chemical energy generated to be extracted as electrical energy. The metal-air battery absorbs oxygen during discharge and emits oxygen during charge. As described above, since the metal-air battery uses oxygen in the air as an active material, the energy density of the metal-air battery may be greater than those of other batteries. For example, the metal-air battery may have an energy density several times higher than that of a conventional lithium ion battery.

In addition, since the metal-air battery has a low probability of igniting due to an abnormally high temperature, the metal-air battery is highly stable and, since the metal-air battery is only operated by intercalation and deintercalation of oxygen without using a heavy metal, there is a low probability of environmental contamination by the metal-air battery. Due to such various desired features, much research into the metal-air battery is currently being performed.

SUMMARY

According to an embodiment, a metal-air battery includes a unit cell wound into a roll. In such an embodiment, the unit cell includes a negative-electrode metal layer having a first surface located in a circumferential direction of the roll, and a second surface facing the first surface and located in the circumferential direction of the roll; a first electrolyte film and a first positive-electrode layer sequentially disposed on the first surface of the negative-electrode metal layer; and a second electrolyte film and a second positive-electrode layer sequentially disposed on the second surface of the negative-electrode metal layer. In such an embodiment, the unit cell is wound in a way such that the first positive-electrode layer and the second positive-electrode layer face each other.

In an embodiment, the first electrolyte film and the second electrolyte film may be continuously connected to each other. The first positive-electrode layer and the second positive-electrode layer may be continuously connected to each other.

In an embodiment, the negative-electrode metal layer may have a third surface between the first surface and the second surface, and a fourth surface facing the third surface. In such an embodiment, the first electrolyte film and the second electrolyte film may be connected to each other to surround the third surface of the negative-electrode metal layer.

In an embodiment, the first positive-electrode layer and the second positive-electrode layer may be connected to each other to surround the third surface of the negative-electrode metal layer.

In an embodiment, the unit cell may further include a first separation film disposed between the first electrolyte film and the first positive-electrode layer; and a second separation film disposed between the second electrolyte film and the second positive-electrode layer. In such an embodiment, the first separation film and the second separation film may be continuously connected to each other to surround the third surface of the negative-electrode metal layer.

In an embodiment, the unit cell may further include a negative-electrode current collector connected to the fourth surface of the negative-electrode metal layer.

In an embodiment, the unit cell may further include a sealing material which seals the fourth surface of the negative-electrode metal layer.

In an embodiment, the unit cell may be wound in the way such that the third surface of the negative-electrode metal layer is located at a center of the roll and the fourth surface of the negative-electrode metal layer is located at an outermost part of the roll.

In an embodiment, the unit cell may further include a first gas-diffusion layer disposed on the first positive-electrode layer; and a second gas-diffusion layer disposed on the second positive-electrode layer. In such an embodiment, the first gas-diffusion layer and the second gas-diffusion layer may be continuously connected to each other, and the unit cell may be wound in the way such that the first gas-diffusion layer and the second gas-diffusion layer face each other.

In an embodiment, the first electrolyte film and the second electrolyte film may be spaced apart from each other. The first positive-electrode layer and the second positive-electrode layer may be spaced apart from each other.

In an embodiment, the negative-electrode metal layer may have a third surface between the first surface and the second surface, and a fourth surface facing the third surface. In such an embodiment, the first and second positive-electrode layers may extend beyond the third and fourth surfaces of the negative-electrode metal layer.

In an embodiment, the unit cell may further include a first separation film disposed between the first electrolyte film and the first positive-electrode layer; and a second separation film disposed between the second electrolyte film and the second positive-electrode layer. In such an embodiment, the first and second separation films may be spaced apart from each other and extend beyond the third and fourth surfaces of the negative-electrode metal layer.

In an embodiment, the unit cell may further include a sealing material which seals the third and fourth surfaces of the negative-electrode metal layer.

In an embodiment, the unit cell may further include a negative-electrode current collector connected to the fourth surface of the negative-electrode metal layer and extending through the sealing material.

In an embodiment, the unit cell may further include a first gas-diffusion layer disposed on the first positive-electrode layer; and a second gas-diffusion layer disposed on the second positive-electrode layer. In such an embodiment, the first and second gas-diffusion layers may be separated from each other. In such an embodiment, the unit cell may be wound in the way such that the first and second gas-diffusion layers face each other.

In an embodiment, the first positive-electrode layer may include a plurality of first positive-electrode plates arranged in the circumferential direction of the roll. In such an embodiment, a first gap may be defined between each two adjacent first positive-electrode plates. In such an embodiment, the second positive-electrode layer may include a plurality of second positive-electrode plates arranged in the circumferential direction of the roll. In such an embodiment, a second gap may be defined between each two adjacent second positive-electrode plates. In such an embodiment, the roll may be wound in a way such that the second positive-electrode plates connect the two adjacent first positive-electrode plates across the first gap.

In an embodiment, the metal-air battery may include a plurality of unit cells wound into the roll. In such an embodiment, the plurality of unit cells may be stacked in a way such that central axes of the roll do not coincide with one another and outer circumference surfaces of the roll are in contact with one another.

In an embodiment, the metal-air battery may include a plurality of unit cells wound into the roll. In such an embodiment, the plurality of unit cells may be stacked in a way such that central axes of the roll coincide with one another.

According to another embodiment, a metal-air battery includes a first cylindrical part and a second cylindrical part arranged in a concentric form to share a central axis. In such an embodiment, each of the first cylindrical part and the second cylindrical part includes a unit cell. In such an embodiment, the unit cell of each of the first cylindrical part and the second cylindrical part includes a negative-electrode metal layer having a first surface located in a circumferential direction, and a second surface facing the first surface and located in the circumferential direction; a first electrolyte film and a first positive-electrode layer sequentially disposed on the first surface of the negative-electrode metal layer; and a second electrolyte film and a second positive-electrode layer sequentially disposed on the second surface of the negative-electrode metal layer.

In an embodiment, the unit cell of the first cylindrical part may have a cylindrical shape, and the unit cell of the second cylindrical part may have a cylindrical shape. In such an embodiment, the second positive-electrode layer, the second electrolyte film, the negative-electrode metal layer, the first electrolyte film and the first positive-electrode layer of the unit cell of each of the first cylindrical part and the second cylindrical part may be arranged in a concentric form.

In an embodiment, In the unit cell of each of the first cylindrical part and the second cylindrical part, the second electrolyte film may be disposed to surround the second positive-electrode layer, the negative-electrode metal layer may be disposed to surround the second electrolyte film, the first electrolyte film may be disposed to surround the negative-electrode metal layer, and the first positive-electrode layer may be disposed to surround the first electrolyte film.

In an embodiment, the second positive-electrode layer of the unit cell of the first cylindrical part and the first positive-electrode layer of the unit cell may of the second cylindrical part share a common positive-electrode plate.

In an embodiment, the first cylindrical part may include a plurality of unit cells arranged in the circumferential direction.

In an embodiment, in each of the plurality of unit cells of the first cylindrical part, the negative-electrode metal layer may have a third surface between the first surface and the second surface, and a fourth surface facing the third surface. In such an embodiment, the first electrolyte film and the second electrolyte film may be connected to each other to surround the third and fourth surfaces of the negative-electrode metal layer. In such an embodiment, the first positive-electrode layer and the second positive-electrode layer may be connected to each other to surround the third and fourth surface of the negative-electrode metal layer.

In an embodiment, the third surface and the fourth surface may be located in a direction of a diameter of the metal-air battery.

In an embodiment, the first cylindrical part may include a single unit cell having a cylindrical shape, and the second cylindrical part may include a plurality of unit cells arranged in the circumferential direction.

In an embodiment, the unit cell of each of the first cylindrical part and the second cylindrical part may further include a first separation film disposed between the first electrolyte film and the first positive-electrode layer; and a second separation film disposed between the second electrolyte film and the second positive-electrode layer.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
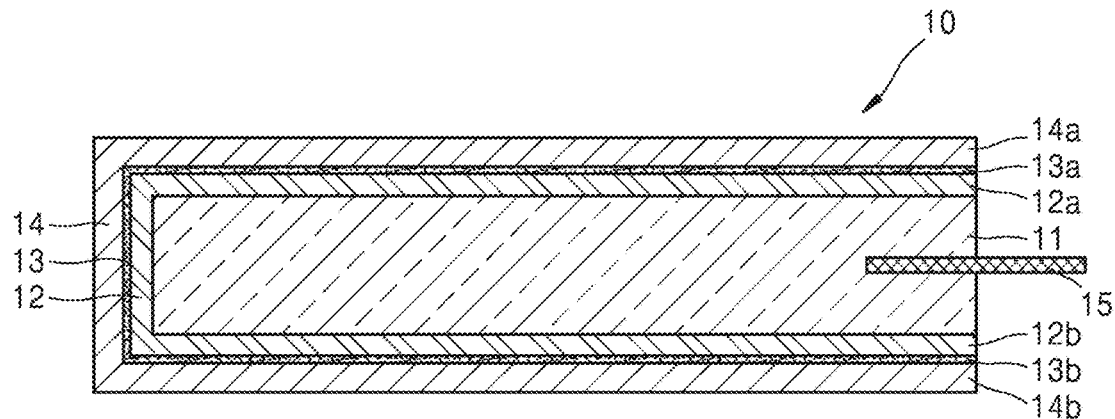
FIG. 1 is a schematic cross-sectional view of a unit cell of a metal-air battery according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a cylindrical metal-air battery will be described in detail with reference to the accompanying drawings.

FIG. 1 is a schematic cross-sectional view of a unit cell of a metal-air battery according to an embodiment.

Referring to FIG. 1, an embodiment of a unit cell 10 may include a negative-electrode metal layer 11, a first electrolyte film 12a disposed on a top surface of the negative-electrode metal layer 11, a first separation film 13a disposed on a top surface of the first electrolyte film 12a, a first positive-electrode layer 14a disposed on a top surface of the first separation film 13a, a second electrolyte film 12b disposed on a bottom surface of the negative-electrode metal layer 11, a second separation film 13b disposed on a bottom surface of the second electrolyte film 12b, and a second positive-electrode layer 14b disposed on a bottom surface of the second separation film 13b.

In such an embodiment, as illustrated in FIG. 1, the first electrolyte film 12a and the second electrolyte film 12b further extend to a first side surface of the negative-electrode metal layer 11 between the top and bottom surfaces of the negative-electrode metal layer 11, and are continuously connected to each other to surround the first side surface of the negative-electrode metal layer 11. In such an embodiment, the first separation film 13a and the second separation film 13b further extend to the first side surface of the negative-electrode metal layer 11, and are continuously connected to each other to surround the first side surface of the negative-electrode metal layer 11. The first positive-electrode layer 14a and the second positive-electrode layer 14b further extend to the first side surface of the negative-electrode metal layer 11, and are continuously connected to each other to surround the first side surface of the negative-electrode metal layer 11. In such an embodiment, the first electrolyte film 12a and the second electrolyte film 12b collectively define an electrolyte film 12, the first separation film 13a and the second separation film 13b collectively define a separation film 13, and the first positive-electrode layer 14a and the second positive-electrode layer 14b collectively define a positive-electrode layer 14. Thus, the first side surface of the negative-electrode metal layer 11 is surrounded by the electrolyte film 12, the separation film 13, and the positive-electrode layer 14, and only a second side surface thereof opposite to the first side surface may be exposed to an outside. A negative-electrode current collector 15 may be further disposed in the exposed second side surface of the negative-electrode metal layer 11, through which current is drawn to the outside.

Figure 2:
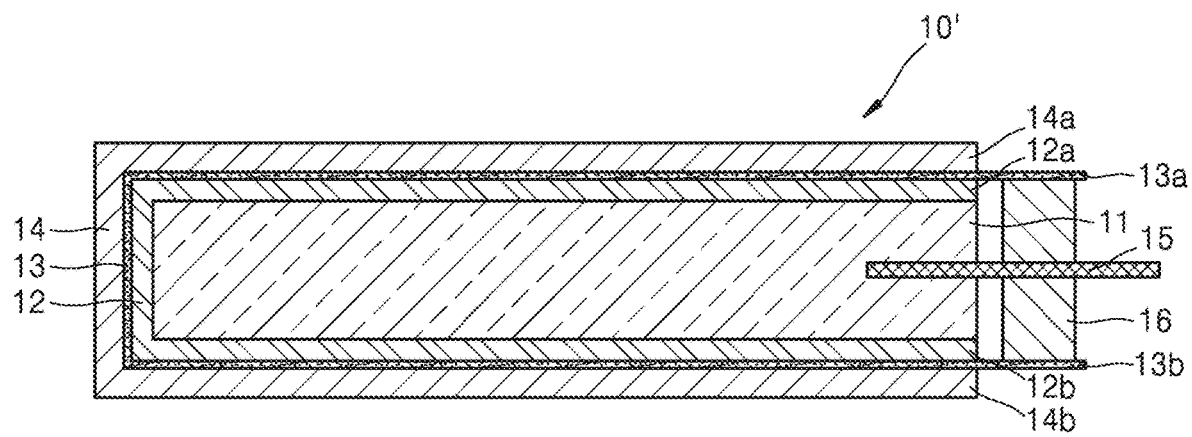
FIG. 2 is a schematic cross-sectional view of a unit cell of a metal-air battery according to an alternative embodiment.

FIG. 2 is a schematic cross-sectional view of a unit cell of a metal-air battery according to an alternative embodiment.

Referring to FIG. 2, in such an embodiment, a first separation film 13a and a second separation film 13b of a unit cell 10' may extend or protrude beyond a second side surface of a negative-electrode metal layer 11. A gap or a space between protruding portions of the first separation film 13a and the second separation film 13b over the second side surface of the negative-electrode metal layer 11 may be filled with a sealing material 16 to seal the second side surface of the negative-electrode metal layer 11, thereby effectively preventing contact of the negative-electrode metal layer 11 with air. In such an embodiment, the negative-electrode current collector 15 may be connected to the second side surface of the negative-electrode metal layer 11 and extend through the sealing material 16.

The negative electrode metal layer 11 capable of intercalating/deintercalating metal ions may include or be formed of, for example, lithium (Li), sodium (Na), zinc (Zn), potassium (K), calcium (Ca), magnesium (Mg), iron (Fe), aluminum (Al), or an alloy thereof.

The first and second electrolyte films 12a and 12b transfer metal ions to the first and second positive-electrode layers 14a and 14b, respectively. To transfer metal ions to the first and second positive-electrode layers 14a and 14b, the first and second electrolyte films 12a and 12b may include an electrolyte formed by dissolving a metal salt in a solvent. In general, the electrolyte may be in a solid state and includes a polymer-based electrolyte, an inorganic electrolyte, or a composite electrolyte obtained from a mixture thereof, and is manufactured to be flexible so that the electrolyte may be easily bent. In one embodiment, for example, the metal salt may be, for example, lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or lithium bis(trifluoromethanesulfonyl)imide ("LiTFSI"). Another metal salt such as $AlCl_3$, $MgCl_2$, NaCl, KCl, NaBr, KBr, or $CaCl_2$ may be added to the lithium salt. Any material that may dissolve the lithium salt and the metal salt may be used as the solvent.

The first and second separation films 13a and 13b have conductivity with respect to metal ions while preventing penetration of oxygen. The first and second separation films 13a and 13b may be flexible polymer-based separation films. In one embodiment, for example, the first and second separation films 13a and 13b may include or be formed of polymer non-woven fabric such as non-woven fabric of polypropylene or non-woven fabric of polyphenylene sulfide, a porous film of olefin-based resin such as polyethylene or polypropylene, or the like.

Although FIGS. 1 and 2 illustrate embodiments where the first and second electrolyte films 12a and 12b and the first and second separation films 13a and 13b are separately defined, the first and second electrolyte films 12a and 12b or the first and second separation films 13a and 13b may be formed in a single unitary layer by impregnating pores of porous separation films with an electrolyte. In such an embodiment, the first electrolyte film 12a and the first separation film 13a may be formed in a single layer, and the second electrolyte film 12b and the second separation film 13b may be formed in a single unitary layer. In one embodiment, for example, a separation film or an electrolyte film may be formed in a single unitary layer by impregnating pores of porous separation films with an electrolyte formed by mixing polyethylene oxide ("PEO") with LiTFSI.

The first and second positive-electrode layers 14a and 14b may include an electrolyte for conduction of metal ions, a catalyst for reduction and oxidation reactions of oxygen, a conductive material, and a binder. In one embodiment, for example, the first and second positive-electrode layers 14a and 14b may be formed by mixing the electrolyte, the catalyst, the conductive material and the binder with each other, and adding a solvent to the mixture to make positive-electrode slurry and then drying the positive-electrode slurry.

Here, the electrolyte may include the lithium salt or the metal salt described above. A porous carbonaceous material, a conductive metal material, a conductive organic material, or a mixture thereof may be used as the conductive material. In one embodiment, for example, carbon black, graphite, graphene, activated carbon, carbon fibers, and carbon nanotubes may be used as the carbonaceous material. The conductive metal material may be, for example, in the form of metal powder. In one embodiment, for example, platinum (Pt), gold (Au), silver (Ag), or an oxide of manganese (Mn), nickel (Ni), or cobalt (Co) may be used as the catalyst. In one embodiment, for example, polytetrafluoroethylene ("PTFE"), polypropylene, polyvinylidene fluoride ("PVDF"), polyethylene, styrene-butadiene rubber, etc. may be used as the binder.

The first and second positive-electrode layers 14a and 14b may be formed to be porous so that the first and second positive-electrode layers 14a and 14b may serve or function as gas-diffusion layers for absorbing oxygen in the atmosphere. Alternatively, an additional gas-diffusion layer may be further disposed on the first and second positive-electrode layers 14a and 14b.

Figure 3:
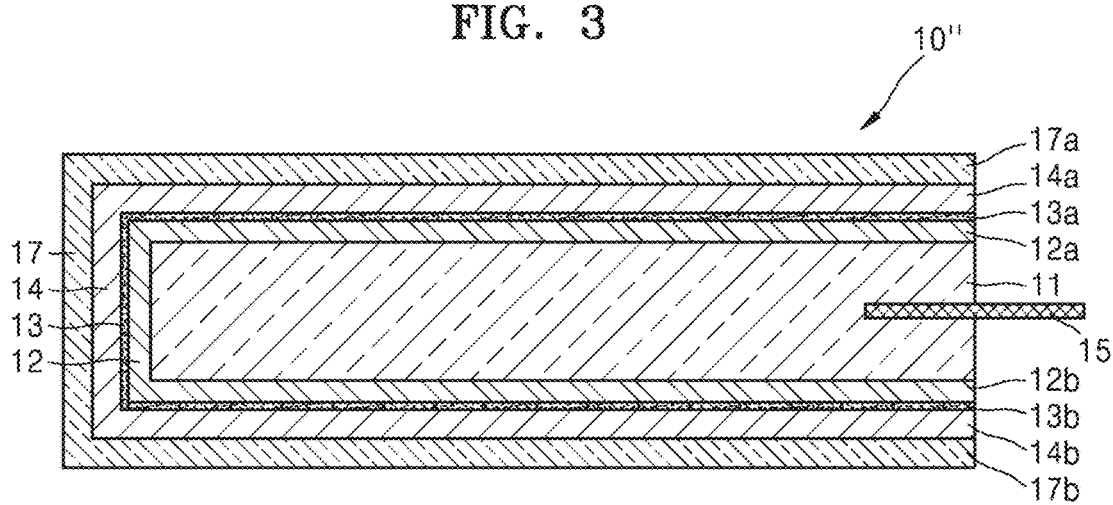
FIG. 3 is a schematic cross-sectional view of a unit cell of a metal-air battery according to another alternative embodiment.

FIG. 3 is a schematic cross-sectional view of a unit cell of a metal-air battery according to another alternative embodiment.

Referring to FIG. 3, a unit cell 10" may include a first gas-diffusion layer 17a disposed on a top surface of a first positive-electrode layer 14a, and a second gas-diffusion layer 17b disposed on a bottom surface of a second positive-electrode layer 14b. The first gas-diffusion layer 14a and the second gas-diffusion layer 14b may extend to a first side surface of a negative-electrode metal layer 11 be continuously connected to each other to surround the first side surface of the negative-electrode metal layer 11.

The first and second gas-diffusion layers 17a and 17b absorb oxygen in the atmosphere and provide the absorbed oxygen to the first and second positive-electrode layers 14a and 14b. To provide oxygen in the atmosphere to the first and second positive-electrode layers 14a and 14b, the first and second gas-diffusion layers 17a and 17b may have a porous structure to smoothly diffuse oxygen from the outside. In one embodiment, for example, the first and second gas-diffusion layers 17a and 17b may include or be formed of carbon paper, carbon cloth, or carbon felt using carbon fiber, or may include or be formed of sponge foam metal or a metal fiber mat. Alternatively, the first and second gas-diffusion layers 17a and 17b may include or be formed of a flexible porous material having non-conductive properties, such as non-woven fabric.

Figure 4:
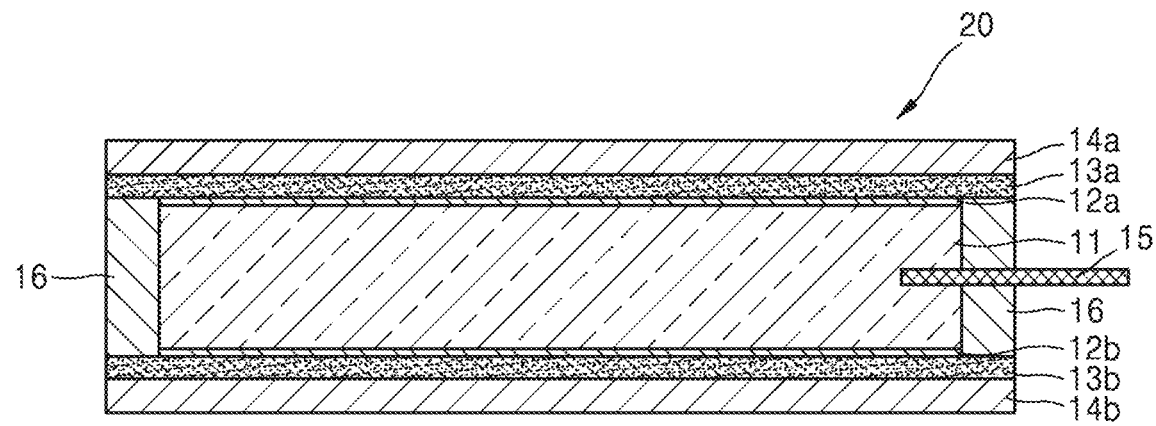
FIG. 4 is a schematic cross-sectional view of a unit cell of a metal-air battery according to another alternative embodiment.

FIG. 4 is a schematic cross-sectional view of a unit cell of a metal-air battery according to another alternative embodiment.

Referring to FIG. 4, an embodiment of a unit cell 20 may include a negative-electrode metal layer 11, a first electrolyte film 12a disposed on a top surface of the negative-electrode metal layer 11, a first separation film 13a disposed on a top surface of the first electrolyte film 12a, a first positive-electrode layer 14a disposed on a top surface of the first separation film 13a, a second electrolyte film 12b disposed on a bottom surface of the negative-electrode metal layer 11, a second separation film 13b disposed on a bottom surface of the second electrolyte film 12b, and a second positive-electrode layer 14b disposed on a bottom surface of the second separation film 13b.

In such an embodiment, as illustrated in FIG. 4, the first electrolyte film 12a and the second electrolyte film 12b are separated or spaced apart from each other. In such an embodiment, the first separation film 13a and the second separation film 13b are separated or spaced apart from each other, and the first positive-electrode layer 14a and the second positive-electrode layer 14b are separated or spaced apart from each other. In an alternative embodiment, the first separation film 13a and the first electrolyte film 12a may be formed in a single layer, and the second separation film 13b and the second electrolyte film 12b may be formed in a single layer. In such an embodiment, the first separation film 13a between the first electrolyte film 12a and the first positive-electrode layer 14a, and the second separation film 13b between the second electrolyte film 12b and the second positive-electrode layer 14b may be omitted.

The unit cell 20 may further include a sealing material 16 disposed on a first side surface and a second side surface of the negative-electrode metal layer 11 between the top and bottom surfaces of the negative-electrode metal layer 11, and a negative-electrode current collector 15 connected to the second side surface of the negative-electrode metal layer 11 and extending through the sealing material 16. The sealing material 16 may seal the first side surface and the second side surface of the negative-electrode metal layer 11 to prevent contact of the negative-electrode metal layer 11 with air outside the unit cell 20. To fix the sealing material 16, the first separation film 13a and the second separation film 13b may extend beyond the first and second side surfaces of the negative-electrode metal layer 11. In such an embodiment, the first positive-electrode layer 14a and the second positive-electrode layer 14b may extend or protrude beyond the first and second side surfaces of the negative-electrode metal layer 11. Thus, a gap or a space between protruding portions of the first separation film 13a and the second separation film 13b may be filled with the sealing material 16. In an embodiment, where the first separation film 13a and the second separation film 13b are omitted, the first electrolyte film 12a and the second electrolyte film 12b may extend beyond the first and second side surfaces of the negative-electrode metal layer 11.

Figure 5:
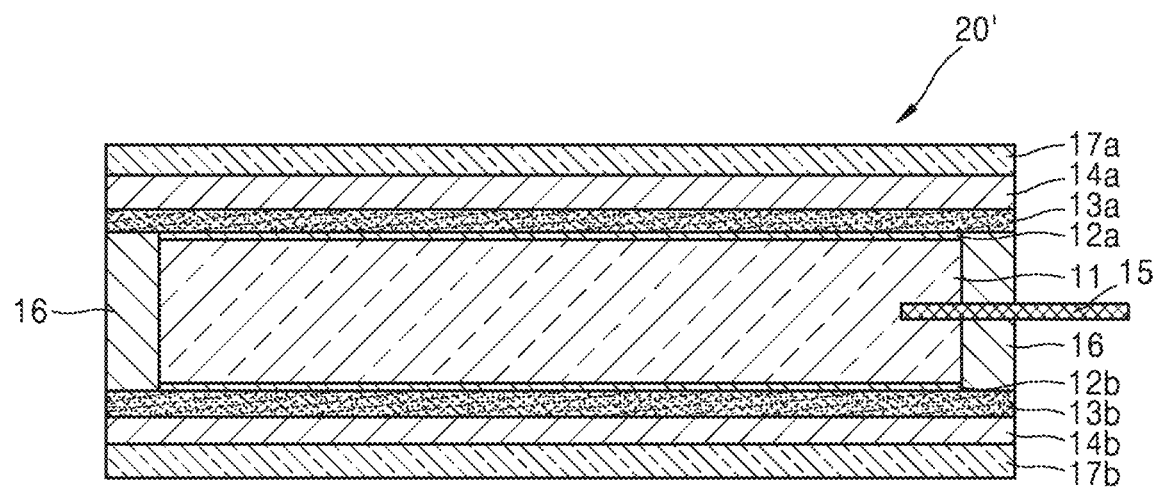
FIG. 5 is a schematic cross-sectional view of a unit cell of a metal-air battery according to another alternative embodiment.

FIG. 5 is a schematic cross-sectional view of a unit cell of a metal-air battery according to another alternative embodiment.

Referring to FIG. 5, an embodiment of a unit cell 20' may further include a first gas-diffusion layer 17a disposed on a top surface of a first positive-electrode layer 14a, and a second gas-diffusion layer 17b disposed on a bottom surface of the second positive-electrode layer 14b. The first gas-diffusion layer 17a and the second gas-diffusion layer 17b may be separated or spaced apart from each other, and extend beyond a first side surface and a second side surface of a negative-electrode metal layer 11.

In an embodiment, a metal-air battery may have a cylindrical shape formed by winding the unit cell 10, 10', 10", 20, or 20' described above into a roll.

Figure 6A:
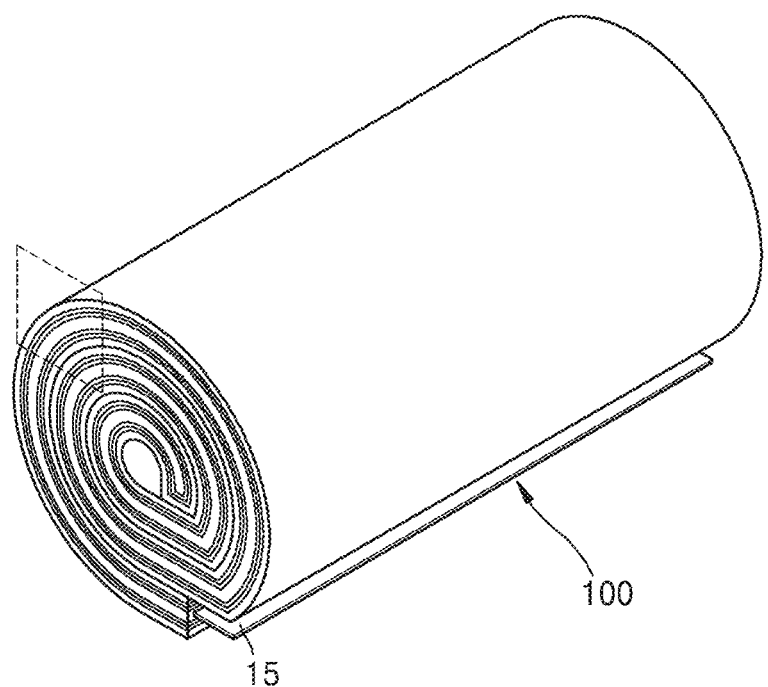
FIG. 6A is a perspective view of a metal-air battery having a rolled cylindrical shape formed by winding the unit cell of FIG. 1 into a roll.
Figure 6B:
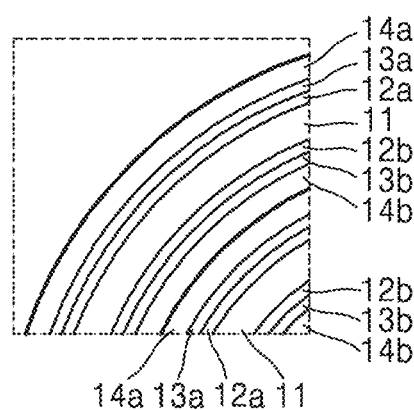
FIG. 6B is an enlarged view of the encircled portion of FIG. 6A.

FIG. 6A is a perspective view of a metal-air battery having a rolled cylindrical shape formed by winding the unit cell 10 of FIG. 1 into a roll, and FIG. 6B is an enlarged view of the encircled portion of FIG. 6A.

Referring to FIGS. 6A and 6B, an embodiment of a metal-air battery 100 is a cylindrical metal-air battery having a rolled cylindrical shape in which the unit cell 10 wound into a roll. The unit cell 10 may be wound in a way such that the first side surface of the negative-electrode metal layer 11 is located at the center of the roll and the second side surface of the negative-electrode metal layer 11 is located at an outermost part of the roll. In such an embodiment, the first side surface of the negative-electrode metal layer 11 surrounded by the electrolyte film 12, the separation film 13 and the positive-electrode layer 14 may be located at a center portion or an innermost portion of the metal-air battery 100, and the second side surface of the negative-electrode metal layer 11 connected to the negative-electrode current collector 15 may be located at an outer side of the metal-air battery 100.

In such an embodiment, where the unit cell 10 is wound into a roll to form a metal-air battery having a rolled cylindrical shape, the top and bottom surfaces of the negative-electrode metal layer 11 facing each other are located in a circumferential direction of the roll, and the first electrolyte film 12a, the first separation film 13a, the first positive-electrode layer 14a, the second electrolyte film 12b, the second separation film 13b and the second positive-electrode layer 14b are also located in the circumferential direction of the roll. The first positive-electrode layer 14a on the top of the unit cell 10 and the second positive-electrode layer 14b on the bottom of the unit cell 10 may contact each other while facing each other when the unit cell 10 is wound. In an embodiment where the unit cell 10" of FIG. 3 is used, the first gas-diffusion layer 17a and the second gas-diffusion layer 17b may contact each other while facing each other when the unit cell 10" is wound.

Figure 7:
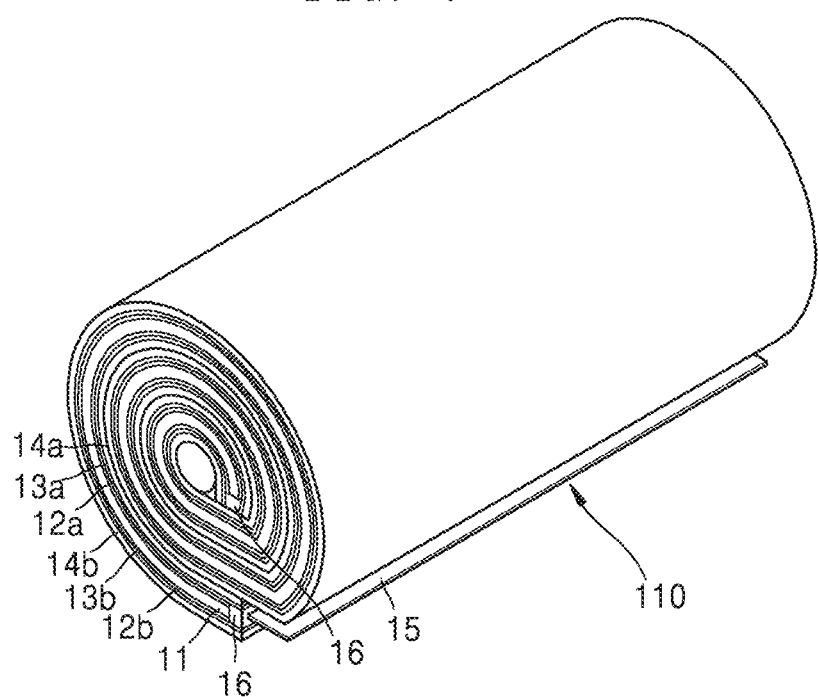
FIG. 7 is a perspective view of a metal-air battery having a rolled cylindrical shape formed by winding the unit cell of FIG. 4 into a roll.

FIG. 7 is a perspective view of a metal-air battery having a rolled cylindrical shape formed by winding the unit cell 20 of FIG. 4 into a roll.

Referring to FIG. 7, an embodiment of a metal-air battery 110 is a cylindrical metal-air battery with the unit cell 20 wound into a roll. In such an embodiment, the unit cell 20 may be wound in a way such that the second side surface of the negative-electrode metal layer 11 connected to the negative-electrode current collector 15 is located at an outer side of the metal-air battery 110 and the first side surface of the negative-electrode metal layer 11 is located at an inside of the metal-air battery 110.

Figure 8:
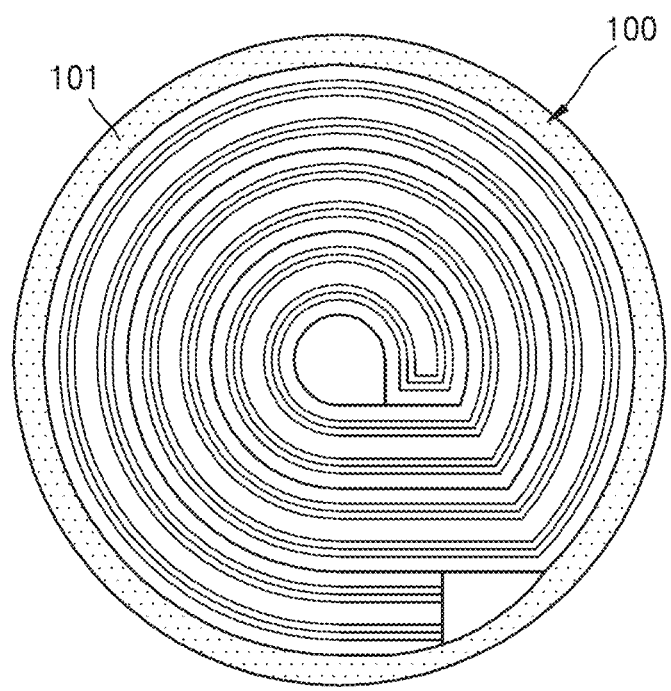
FIG. 8 is a cross-sectional view of a metal-air battery including an outer casing.

FIG. 8 is a cross-sectional view of a metal-air battery including an outer casing.

Referring to FIG. 8, an embodiment of the metal-air battery 100 may further include an outer casing 101 wrapping around the wound unit cell 10 to protect the unit cell 10. In an embodiment, as shown in FIG. 8, the wound unit cell 10 of FIG. 1 may be wrapped with the outer casing 101, but not being limited thereto. In an alternative embodiment, the wound unit cell 20 of FIG. 4 may be wrapped with the outer casing 101.

According to embodiments, as described above, the metal-air battery 100 or 110 may be manufactured in a cylindrical shape to minimize the areas of the outer casing 101 and the negative-electrode current collector 15. Thus, in such embodiments, the metal-air battery 100 or 110 may be decreased in weight and improved in energy density. In such embodiments, the first electrolyte film 12a and the second electrolyte film 12b and the first positive-electrode layer 14a and the second positive-electrode layer 14b may be arranged on opposite surfaces of one negative-electrode metal layer 11 and be symmetrical with each other. Thus, the areas of electrodes may be increased to significantly improve energy density. Furthermore, in such embodiments, the metal-air batteries 100 and 110 have a cylindrical shape and may be thus manufactured as 18650 type batteries. Accordingly, such embodiments of the metal-air battery 100 or 110 may be used in many different applications and may replace another type of battery.

Figure 9:
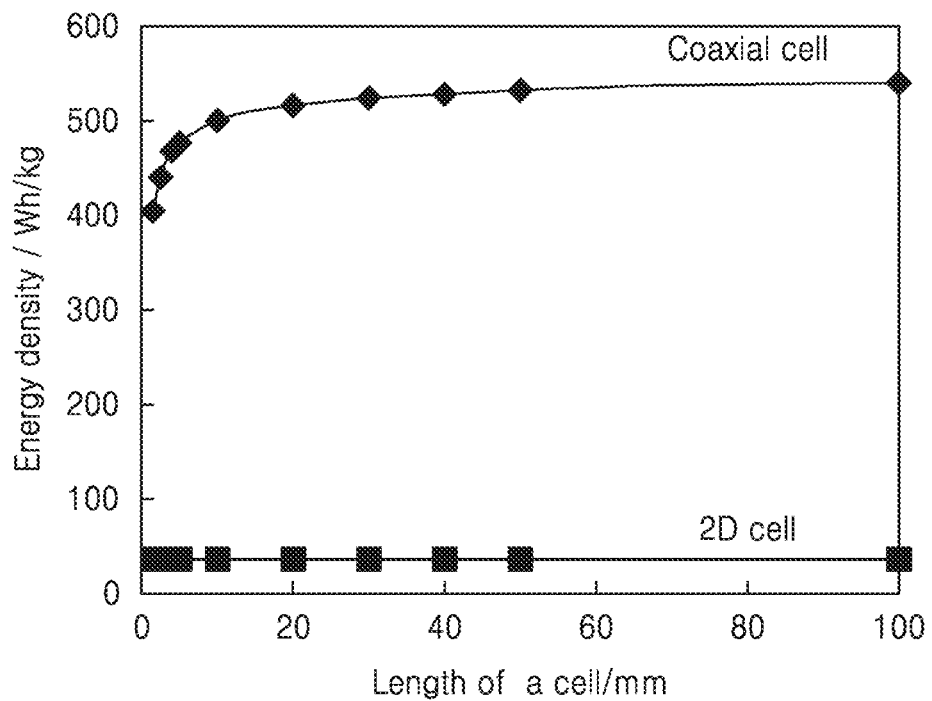
FIG. 9 is a graph showing energy density of the metal-air battery of FIG. 6 according to an embodiment and energy density of a conventional metal-air battery.

FIG. 9 is a graph showing energy density of the metal-air battery 100 of FIG. 6 according to an embodiment and energy density of a conventional metal-air battery. In FIG. 9, a variation in energy density of a conventional metal-air battery having a general planar two-dimensional ("2D") cell shape versus the number of cells and a variation in energy density of an embodiment of the metal-air battery 100 versus the number of cells are compared with each other.

Referring to FIG. 9, the energy density of the conventional metal-air battery (2D cell) hardly changed even when the number of cells was increased. In contrast, the energy density of an embodiment of the metal-air battery 100 (Coaxial cell) increased as the number of cells was increased. When the number of cells was one, the energy density of an embodiment of the metal-air battery 100 (Coaxial cell) was about eight times higher than that of the conventional metal-air battery (2D cell). When the number of cells was twenty, an embodiment of the metal-air battery 100 (Coaxial cell) was about ten times higher than that of the conventional metal-air battery (2D cell).

Figure 10:
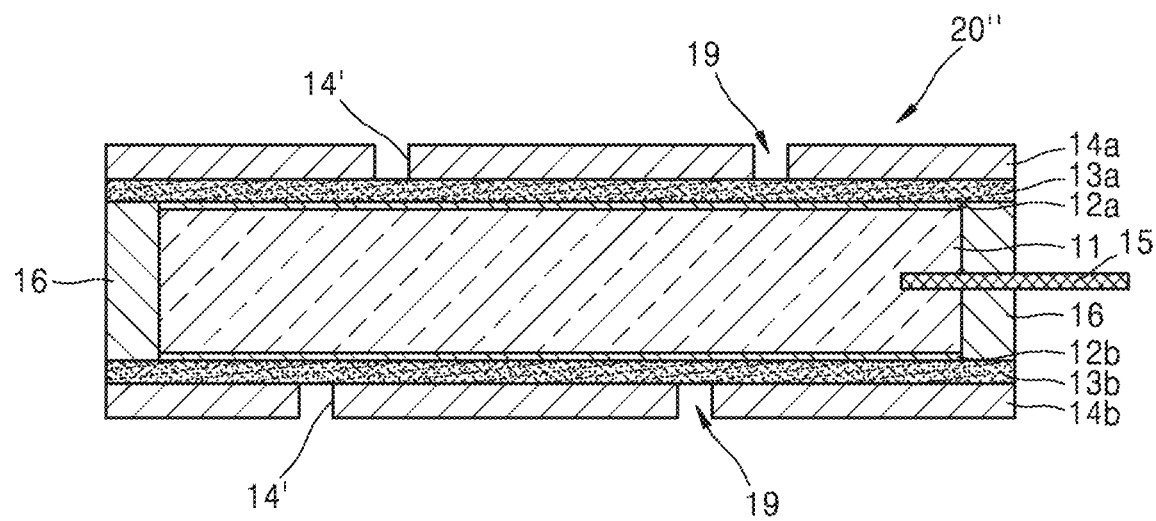
FIG. 10 is a schematic cross-sectional view of a unit cell of a metal-air battery according to another alternative embodiment.

FIG. 10 is a schematic cross-sectional view of a unit cell of a metal-air battery according to another alternative embodiment.

Referring to FIG. 10, in an embodiment, a first positive-electrode layer 14a of a unit cell 20" may include a plurality of positive-electrode plates 14' arranged along a top surface of a first separation film 13a, and a second positive-electrode layer 14b may include a plurality of positive-electrode plates 14' arranged on a bottom surface of a second separation film 13b. In such an embodiment, a gap 19 is defined between each of two adjacent positive-electrode plates 14'. In such an embodiment, when the unit cell 20" is wound into a roll, the radius of curvature between inner and outer sides of the roll changes and thus the plurality of positive-electrode plates 14' and gaps 19 therebetween may effectively prevent the first and second positive-electrode layers 14a and 14b from being damaged.

Figure 11:
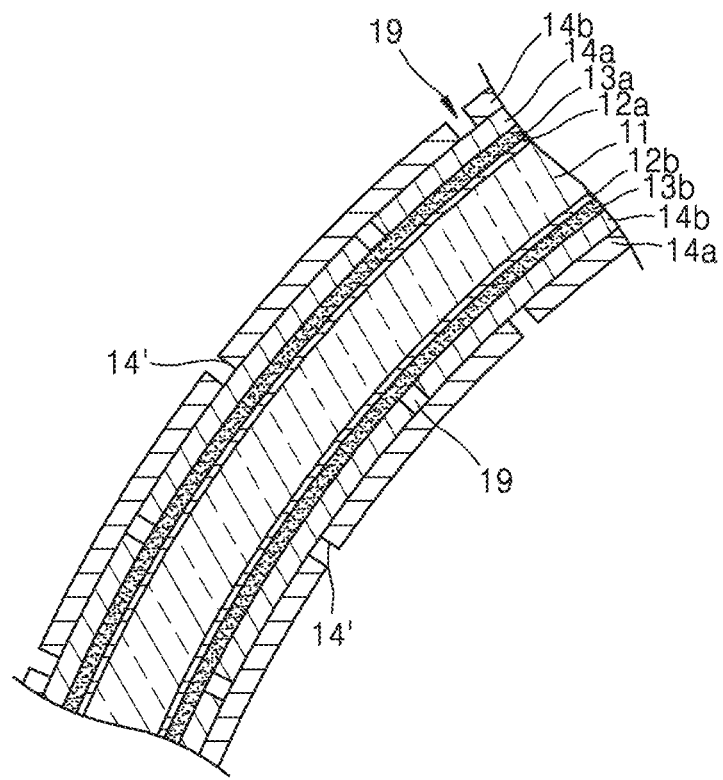
FIG. 11 is a cross-sectional view of a part of a metal-air battery having a rolled cylindrical shape formed by winding the unit cell of FIG. 10 into a roll.

FIG. 11 is a cross-sectional view of a part of a metal-air battery having a rolled cylindrical shape formed by winding the unit cell 20" of FIG. 10 into a roll.

Referring to FIG. 11, in an embodiment, when the unit cell 20" is wound into a roll, the plurality of positive-electrode plates 14' and gaps 19 therebetween may be arranged in a circumferential direction of the roll. When the unit cell 20" is wound, the positive-electrode plates 14' of the first positive-electrode layer 14a and the positive-electrode plates 14' of the second positive-electrode layer 14b may contact each other while facing each other. Here, the positive-electrode plates 14' of the second positive-electrode layer 14b may be arranged across the gaps 19 of the first positive-electrode layer 14a to connect two adjacent positive-electrode plates 14' of the first positive-electrode layer 14a. Thus, current may smoothly flow between the first positive-electrode layer 14a and the second positive-electrode layer 14b. The lengths of the positive-electrode plates 14' and the gaps 19 may be determined to be not uniform when the unit cell 20" is wound, such that the gaps 19 of the second positive-electrode layer 14b and the gaps 19 of the first positive-electrode layer 14a do not coincide with each other and the positive-electrode plates 14' of the second positive-electrode layer 14b connect two adjacent positive-electrode plates 14' of the first positive-electrode layer 14a to each other.

Figure 12:
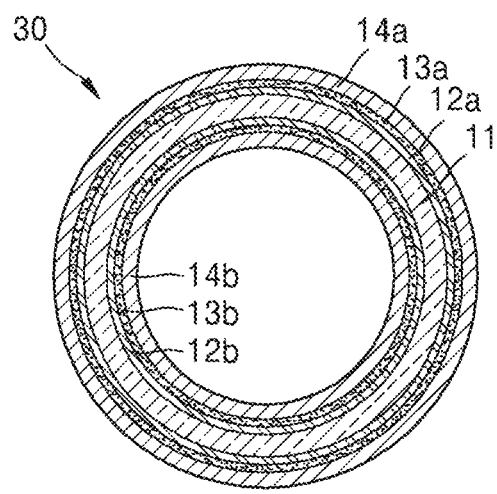
FIG. 12 is a schematic cross-sectional view of a unit cell of a metal-air battery according to another alternative embodiment.

FIG. 12 is a schematic cross-sectional view of a unit cell of a metal-air battery according to another alternative embodiment.

Referring to FIG. 12, a unit cell 30 may include a negative-electrode metal layer 11 having a cylindrical shape, a first electrolyte film 12a disposed on an outer circumference surface of the negative-electrode metal layer 11, a first separation film 13a disposed on an outer circumference surface of the first electrolyte film 12a, a first positive-electrode layer 14a disposed on an outer circumference surface of the first separation film 13a, a second electrolyte film 12b disposed on an inner circumference surface of the negative-electrode metal layer 11, a second separation film 13b disposed on an inner circumference surface of the second electrolyte film 12b, and a second positive-electrode layer 14b disposed on an inner circumference surface of the second separation film 13b. In such an embodiment, the negative-electrode metal layer 11, the first electrolyte film 12a, the first separation film 13a, the first positive-electrode layer 14a, the second electrolyte film 12b, the second separation film 13b and the second positive-electrode layer 14b may be arranged in a concentric form to have the same central axis. In such an embodiment, the second separation film 13b may surround the second positive-electrode layer 14b, the second electrolyte film 12b may surround the second separation film 13b, the negative-electrode metal layer 11 may surround the second electrolyte film 12b, the first electrolyte film 12a may surround the negative-electrode metal layer 11, the first separation film 13a may surround the first electrolyte film 12a, and the first positive-electrode layer 14a may surround the first separation film 13a.

In such an embodiment, as described above, the first separation film 13a and the first electrolyte film 12a may be formed in a single layer, and the second separation film 13b and the second electrolyte film 12b may be formed in a single layer. In such an embodiment, the first positive-electrode layer 14a may be disposed on the outer circumference surface of the first electrolyte film 12a, and the second positive-electrode layer 14b may be disposed on the inner circumference surface of the second electrolyte film 12b.

Figure 13:
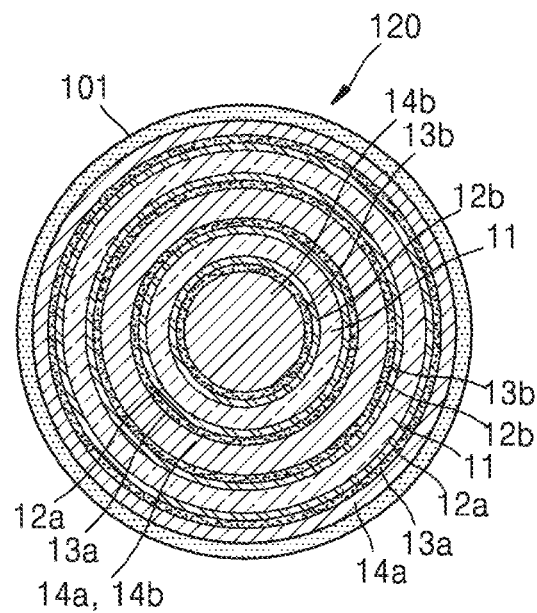
FIG. 13 is a cross-sectional view of a metal-air battery including the unit cell of FIG. 12.

FIG. 13 is a cross-sectional view of a metal-air battery including the unit cell 30 of FIG. 12.

Referring to FIG. 13, an embodiment of a metal-air battery 120 may include a plurality of cylindrical units cells 30 arranged in a concentric form. FIG. 13 illustrates the metal-air battery 120 including two unit cells 30, for convenience of illustration, but the metal-air battery 120 may include three or more unit cells 30. Two negative-electrode metal layers 11 may each have an outer circumference surface and an inner circumference surface facing each other and arranged in a circumferential direction. A first electrolyte film 12a, a first separation film 13a and a first positive-electrode layer 14a may be sequentially arranged on each of the outer circumference surfaces of the two negative-electrode metal layers 11. A second electrolyte film 12b, a second separation film 13b and a second positive-electrode layer 14b may be sequentially arranged on each of the inner circumference surfaces of the two negative-electrode metal layers 11. In such an embodiment, the second positive-electrode layer 14b on an innermost part of the metal-air battery 120 may have a cylindrical shape, the center of which is not hollow or is hollow. Among the two adjacent unit cells 30, the first positive-electrode layer 14a of the inner unit cell 30 and the second positive-electrode layer 14b of the outer unit cell 30 may share a common positive-electrode plate. The metal-air battery 120 may further include an outer casing 101 surrounding the first positive-electrode layer 14a of the outermost unit cell 30.

Figure 14:
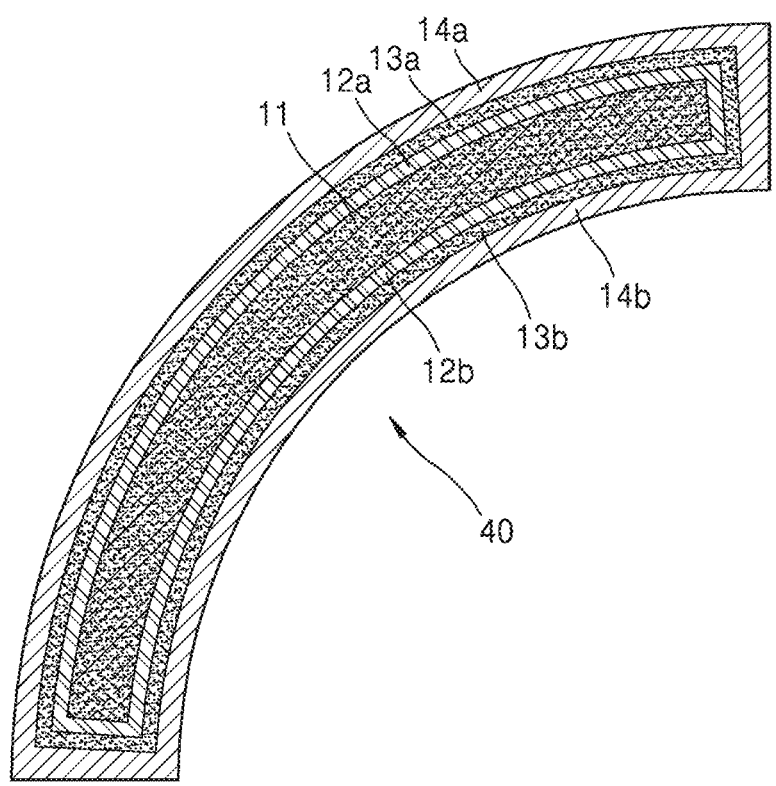
FIG. 14 is a schematic cross-sectional view of a unit cell of a metal-air battery according to another alternative embodiment.

FIG. 14 is a schematic cross-sectional view of a unit cell of a metal-air battery according to another alternative embodiment.

Referring to FIG. 14, in an embodiment, a unit cell 40 may include a negative-electrode metal layer 11 having a segment shape obtained by dividing a cylinder into several parts. The negative-electrode metal layer 11 may have an outer circumference surface and an inner circumference surface facing each other and arranged in a circumferential direction, and two side surfaces connecting the outer circumference surface and the inner circumference surface. The two side surfaces may be located, for example, in a direction of a diameter of the metal-air battery. In such an embodiment, a first electrolyte film 12a and a second electrolyte film 12b may be connected to each other to surround the two side surfaces of the negative-electrode metal layer 11. In such an embodiment, a first separation film 13a and a second separation film 13b may be connected to each other to surround the two side surfaces of the negative-electrode metal layer 11, and a first positive-electrode layer 14a and a second positive-electrode layer 14b may be connected to each other to surround the two side surfaces of the negative-electrode metal layer 11.

Figure 15:
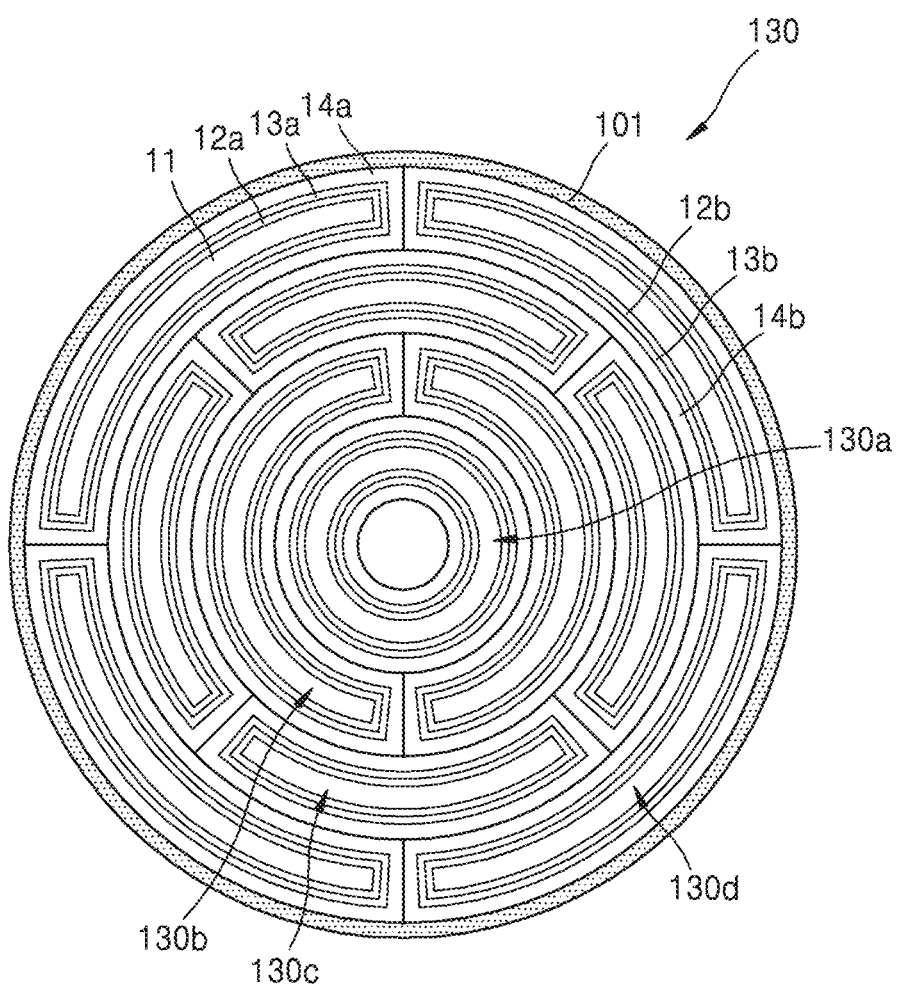
FIG. 15 is a cross-sectional view of a metal-air battery including the unit cell of FIG. 14.

FIG. 15 is a cross-sectional view of a metal-air battery including the unit cell 40 of FIG. 14.

Referring to FIG. 15, an embodiment of a metal-air battery 130 may include a plurality of cylindrical parts 130a, 130b, 130c, and 130d arranged in a concentric form to share a central axis. In one embodiment, for example, a unit cell 30 having the cylindrical shape of FIG. 12 may be arranged as the innermost first cylindrical part 130a. A plurality of unit cells 40 having the segment shape of FIG. 14 may be arranged as the second, third and fourth cylindrical parts 130b, 130c and 130d in a circumferential direction. The metal-air battery 130 may further include an outer casing 101 surrounding the outermost fourth cylindrical part 130d.

In the metal-air battery 130 of FIG. 15, a first positive-electrode layer 14a and a second positive-electrode layer 14b are arranged in a direction of a diameter thereof. Accordingly, in such an embodiment, the areas of surfaces of the first positive-electrode layer 14a and the second positive-electrode layer 14b may increase, thereby substantially increasing energy density of the metal-air battery 130.

The metal-air battery 130 of FIG. 15 may include a unit cell 30 having a cylindrical shape and a plurality of unit cells 40 having a segment shape in various combinations. In one embodiment, for example, one unit cell 30 having a cylindrical shape may be arranged as each of the first and third cylindrical parts 130a and 130c, and a plurality of unit cells 40 having a segment shape may be arranged as the second and fourth cylindrical parts 130b and 130d in the circumferential direction. Alternatively, only a plurality of unit cells 40 having a segment shape may be arranged on the first to fourth cylindrical parts 130a, 130b, 130c, and 130d. In an embodiment, as shown in FIG. 15, the metal-air battery 130 may include four cylindrical parts 130a, 130b, 130c, and 130d, but not being limited thereto. Alternatively, the metal-air battery 130 may include two, three, five, or more cylindrical parts. If an embodiment of the metal-air battery 130 includes only two cylindrical parts and only the unit cell 30 having a cylindrical shape is arranged on each of the two cylindrical parts, such an embodiment of the metal-air battery 130 may substantially be the same as the metal-air battery 120 of FIG. 13.

An embodiment of the metal-air battery 100, 110, 120 or 130 described above may be easily stacked to manufacture a battery module in a convenient manner. Hereinafter, embodiments of a battery module including the metal-air battery will be described.

Figure 16:
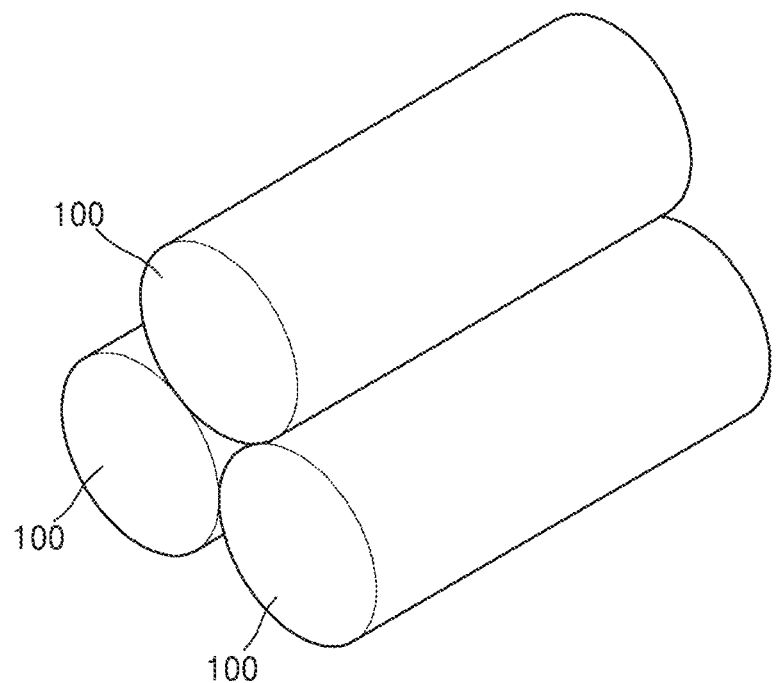
FIG. 16 is a perspective view illustrating a state in which a plurality of metal-air batteries is stacked, according to an embodiment.

FIG. 16 is a perspective view illustrating a state in which a plurality of metal-air batteries 100 is stacked, according to an embodiment.

Referring to FIG. 16, in an embodiment, the plurality of metal-air batteries 100 may be stacked in a way such that central axes thereof do not coincide with another and are parallel with one another and outer circumference surfaces thereof are in contact with one another. Although FIG. 16 illustrates that a type of metal-air battery 100 having a unit cell 10 wound into a roll is stacked, other type of the metal-air battery 110, 120, or 130 may be stacked. Alternatively, the various types of the metal-air battery 100, 110, 120 and 130 may be stacked in various combinations.

Figure 17:
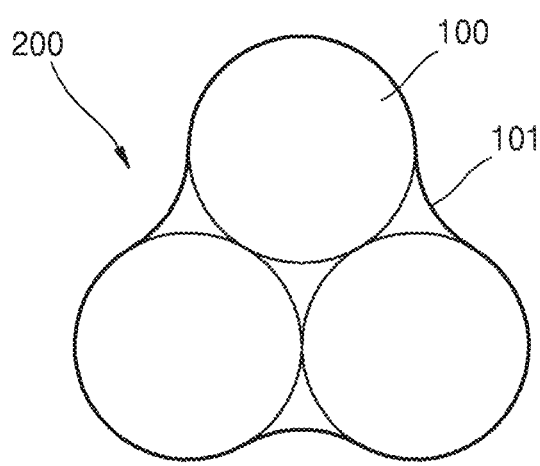
FIG. 17 is a cross-sectional view illustrating a state in which the metal-air batteries of FIG. 16 is packaged.

FIG. 17 is a cross-sectional view illustrating a state in which the stacked metal-air batteries 100 of FIG. 16 are packaged.

Referring to FIG. 17, the stacked metal-air batteries 100 are packaged by wrapping outer circumference surfaces thereof with an outer casing 101, thereby obtaining a battery module 200.

Figure 18:
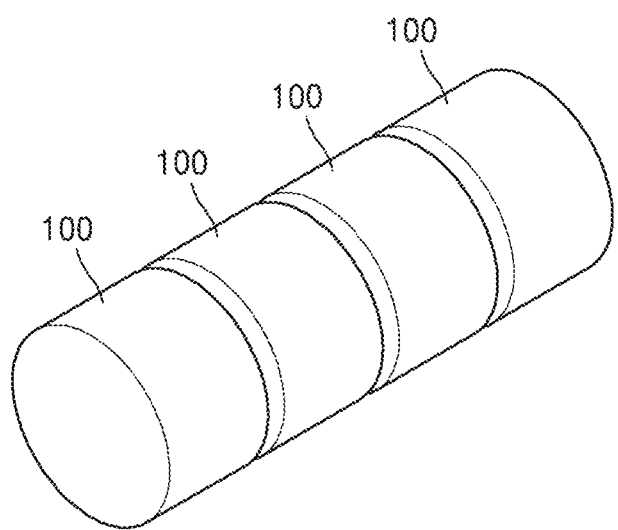
FIG. 18 is a perspective view illustrating a state in which a plurality of metal-air batteries is stacked, according to an alternative embodiment.

FIG. 18 is a perspective view illustrating a state in which a plurality of metal-air batteries 100 is stacked, according to an alternative embodiment.

Referring to FIG. 18, in an alternative embodiment, the plurality of metal-air batteries 100 may be stacked in a way such that central axes thereof coincide with one another. In such an embodiment, a flat bottom surface of each of two adjacent metal-air batteries 100 may be in contact with a flat top surface of the other. Although FIG. 18 illustrates that the plurality of metal-air batteries 100 each having one unit cell wound into a roll are stacked, another type of metal-air battery 110, 120 or 130 may be stacked. Alternatively, various types of metal-air battery 100, 110, 120 and 130 may be stacked in combination.

Some embodiments of the cylindrical metal-air battery have been described above with reference to the accompanying drawings but are merely exemplary. It would be apparent to those of ordinary skill in the art that various changes may be made thereto without departing from the principles and spirit of the inventive concept, the scope of which is defined in the claims and their equivalents. It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A metal-air battery comprising a unit cell wound into a roll,
wherein the unit cell comprises:
a negative-electrode metal layer having a first surface located in a circumferential direction of the roll, a second surface facing the first surface and located in the circumferential direction of the roll, a third surface between the first surface and the second surface, and a fourth surface facing the third surface;
a first electrolyte film and a first positive-electrode layer sequentially disposed on the first surface of the negative-electrode metal layer;
a second electrolyte film and a second positive-electrode layer sequentially disposed on the second surface of the negative-electrode metal layer;
a first sealing material which seals the third surface of the negative-electrode metal layer; and
a second sealing material which seals the fourth surface of the negative-electrode metal layer,
wherein the unit cell is wound into a roll in a way such that the first positive-electrode layer and the second positive-electrode layer face each other, and the first and second sealing materials extend in an axial direction of the roll.

2. The metal-air battery of claim 1, wherein the first electrolyte film and the second electrolyte film are spaced apart from each other, and
wherein the first positive-electrode layer and the second positive-electrode layer are spaced apart from each other.

3. The metal-air battery of claim 1, wherein the unit cell further comprises:
a first separation film disposed between the first electrolyte film and the first positive-electrode layer; and
a second separation film disposed between the second electrolyte film and the second positive-electrode layer,
wherein the first separation film and the second separation film are spaced apart from each other.

4. The metal-air battery of claim 1, wherein the unit cell further comprises a negative-electrode current collector extended through the second sealing material and connected to the fourth surface of the negative-electrode metal layer.

5. The metal-air battery of claim 1, wherein the unit cell is wound in the way such that the third surface of the negative-electrode metal layer is located at a center of the roll and the fourth surface of the negative-electrode metal layer is located at an outermost part of the roll.

6. The metal-air battery of claim 1, wherein the first positive-electrode layer and the second positive-electrode layer extend beyond the third and fourth surfaces of the negative-electrode metal layer.

7. The metal-air battery of claim 6, wherein the first separation film and the second separation film extend beyond the third and fourth surfaces of the negative-electrode metal layer.

8. The metal-air battery of claim 1, wherein the unit cell further comprises:
a first gas-diffusion layer disposed on the first positive-electrode layer; and
a second gas-diffusion layer disposed on the second positive-electrode layer,
wherein the first gas-diffusion layer and the second gas-diffusion layer are spaced apart from each other, and
the unit cell is wound in the way such that the first gas-diffusion layer and the second gas-diffusion layer face each other.

9. The metal-air battery of claim 8, wherein the first gas-diffusion layer and the second gas-diffusion layer extend beyond the third and fourth surfaces of the negative-electrode metal layer.

10. The metal-air battery of claim 1, wherein
the first positive-electrode layer comprises a plurality of first positive-electrode plates arranged in the circumferential direction of the roll, wherein a first gap is defined between each two adjacent first positive-electrode plates,
the second positive-electrode layer comprises a plurality of second positive-electrode plates arranged in the circumferential direction of the roll, wherein a second gap is defined between each two adjacent second positive-electrode plates,
wherein the roll is wound in the way such that the second positive-electrode plates connect the two adjacent first positive-electrode plates across the first gap.

11. The metal-air battery of claim 1, wherein
the metal-air battery comprises a plurality of unit cells wound into the roll,
wherein the plurality of unit cells are stacked in a way such that central axes of the roll do not coincide with one another and outer circumference surfaces of the roll are in contact with one another.

12. The metal-air battery of claim 1, wherein
the metal-air battery comprises a plurality of unit cells wound into the roll,
wherein the plurality of unit cells are stacked in a way such that central axes of the roll coincide with one another.

13. A metal-air battery comprising:
a first cylindrical part and a second cylindrical part arranged in a concentric form to share a central axis,
wherein the second cylindrical part surrounds the first cylindrical part,
wherein the first cylindrical part comprises a first unit cell,
wherein the second cylindrical part comprises a plurality of second unit cells arranged in the circumferential direction, and each of the second unit cells of the second cylindrical part has an arc shape,
wherein each of the second unit cells of the second cylindrical part comprises:
a first negative-electrode metal layer having a first surface located in a circumferential direction, a second surface facing the first surface and located in the circumferential direction, a third surface between the first surface and the second surface and located in a radial direction, and a fourth surface facing the third surface and located in the radial direction;

a first electrolyte film and a first positive-electrode layer sequentially disposed on the first surface of the first negative-electrode metal layer; and a second electrolyte film and a second positive-electrode layer sequentially disposed on the second surface of the first negative-electrode metal layer.

14. The metal-air battery of claim 13, wherein the first unit cell of the first cylindrical part comprises:

a second negative-electrode metal layer having a first surface located in a circumferential direction, and a second surface facing the first surface and located in the circumferential direction;

a third electrolyte film and a third positive-electrode layer sequentially disposed on the first surface of the second negative-electrode metal layer; and a fourth electrolyte film and a fourth positive-electrode layer sequentially disposed on the second surface of the second negative-electrode metal layer.

15. The metal-air battery of claim 14, wherein
the first unit cell of the first cylindrical part has a cylindrical shape,
the fourth positive-electrode layer, the fourth electrolyte film, the negative-electrode metal layer, the third electrolyte film and the third positive-electrode layer of the first unit cell of the first cylindrical part are arranged in a concentric form.

16. The metal-air battery of claim 15, wherein, in the first unit cell of the first cylindrical part,
the fourth electrolyte film is disposed to surround the fourth positive-electrode layer,
the second negative-electrode metal layer is disposed to surround the fourth electrolyte film,
the third electrolyte film is disposed to surround the second negative-electrode metal layer, and
the third positive-electrode layer is disposed to surround the third electrolyte film.

17. The metal-air battery of claim 13, wherein
the first positive-electrode layer and the second positive-electrode layer extend in a radial direction such that the first positive-electrode layer and the second positive-electrode layer are continuously connected to each other, and
the first electrolyte film and the second electrolyte film extend in a radial direction such that the first electrolyte film and the second electrolyte film are continuously connected to each other.

18. The metal-air battery of claim 13, wherein
the first positive-electrode layer comprises a plurality of first positive-electrode plates arranged in the circumferential direction and a first gap defined between each two adjacent positive-electrode plates,
wherein the second positive-electrode layer comprises a plurality of second positive-electrode plates arranged in the circumferential direction and a second gap defined between each two adjacent second positive-electrode plates, and
wherein the second positive-electrode plates are disposed to connect the two adjacent first positive-electrode plates across the first gap.

19. The metal-air battery of claim 1, wherein
the first sealing material is located at a center of the roll, and
the second sealing material is located at an uttermost part of the roll.

* * * * *